May 4, 1954
L. S. REID
2,677,435
GAS CONTACTOR
Filed March 11, 1950
2 Sheets-Sheet 1
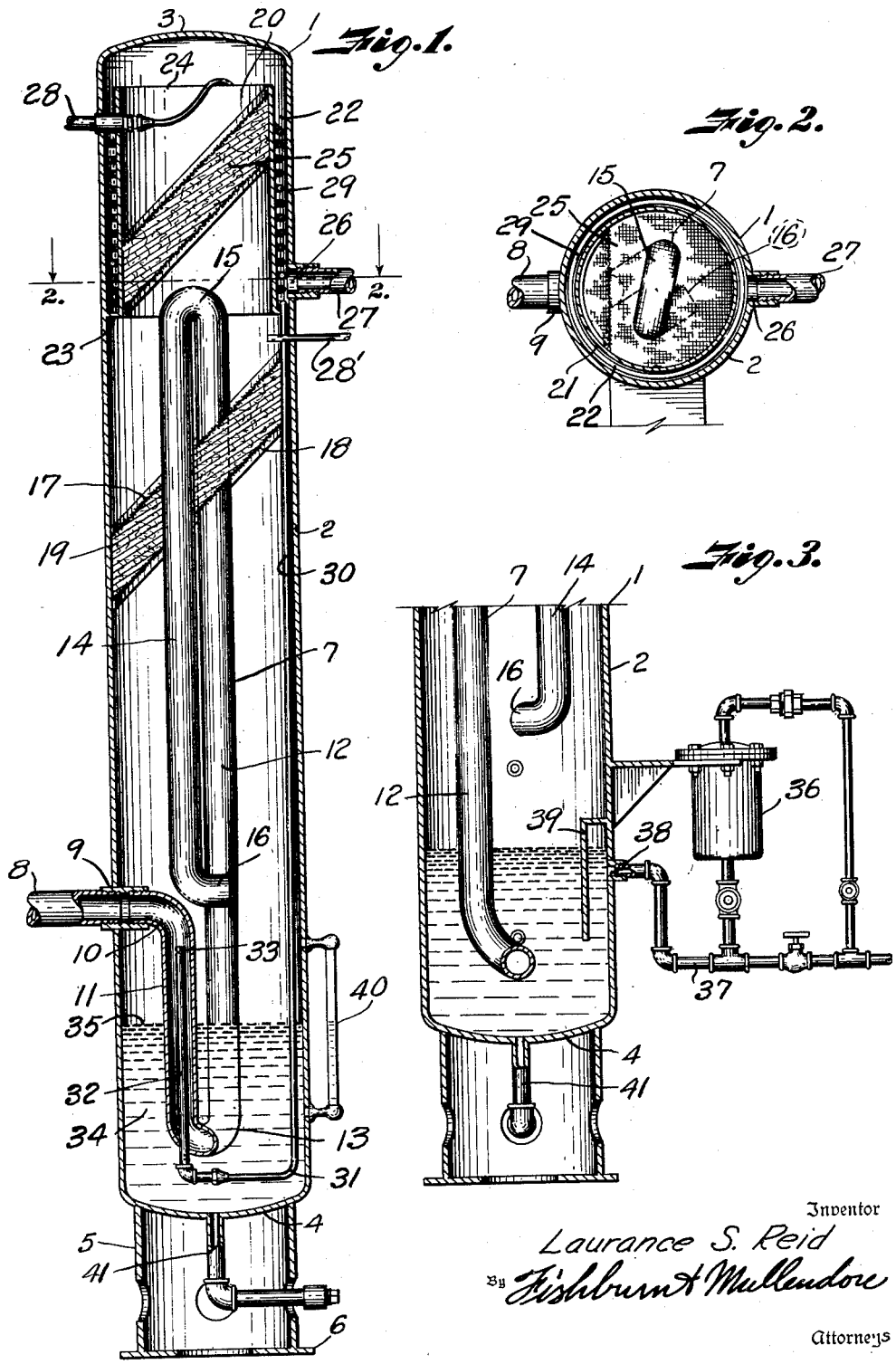
Inventor
Laurance S. Reid
By Fishburn & Mullendore
Attorneys May 4, 1954  L. S. REID  2,677,435
GAS CONTACTOR Filed March 11, 1950  2 Sheets-Sheet 2

Inventor
Laurance S. Reid
By Fishburn & Mullendore
Attorneys

Patented May 4, 1954

2,677,435

UNITED STATES PATENT OFFICE 2,677,435

GAS CONTACTOR

Laurance S. Reid, Norman, Okla.

Application March 11, 1950, Serial No. 149,202

9 Claims. (Cl. 183—11)

This invention relates to an apparatus for contacting a gas mixture with a liquid to effect removal of one or more components of the mixture and is readily adapted to any process where gas mixtures require simple purification from suspended solid matter, or more complex absorption of deleterious or valuable vapor components.

The apparatus for carrying out the desired treatment of a gas mixture is particularly useful in processing gas continuously at comparatively low rates of flow. It is particularly desirable in cases where differential concentrations of any absorbable key component in the gas and the absorbing medium are comparatively large; that is, where there is a large driving force available for causing interphase transfer of the material in question, and in cases where equilibrium conditions are very easily and rapidly attained.

Heretofore, contact of gas with a liquid has usually been accomplished by distributing the liquid and gas in counterflow in a tower containing bubble trays, ceramic packing, or the like. These methods require expensive and relatively large apparatus because the transfer efficiency obtained is relatively low.

It is therefore the purpose of the present invention to provide a simple compact and inexpensive apparatus that is easy to fabricate and so efficient that it may be exceptionally small in comparison with conventional apparatus now in use.

Other objects of the invention are to provide an apparatus which effects intimate mixture of liquid and a gas responsive to the gas flow; to provide a contacting apparatus adapted to operate efficiently with a relatively small pressure drop and thereby provide an apparatus of high volumetric capacity; and to provide an apparatus which is adapted to one or more contact stages.

In accomplishing these and other objects of the invention, hereinafter pointed out, I have provided improved structure, the preferred forms of which are illustrated in the accompanying drawings wherein:

Fig. 2 is a horizontal section on a line 2—2 of Fig. 1.

Fig. 3 is a sectional view of the lower portion of the contact apparatus taken at right angles to the section illustrated in Fig. 1.

Fig. 4 is a vertical section through a modified form of apparatus which provides a plurality of contact stages between the gas mixture and the liquid.

Referring more in detail to the drawings:

As above inferred, the apparatus of the present invention is adapted to treatment of a mixed gas stream for various purposes; for example, to provide contact between a dirt-laden gas and a suitable liquid to effect transfer of finely divided solid particles from the gas into the liquid.

Another use is the dehydration of gas mixtures, by bringing a wet gas stream into contact with a liquid desiccant such as glycol-water solution; or the apparatus may be used in processing natural gas for its natural gasoline content by bringing it into contact with an absorption oil.

A further use to which the invention is adapted is the treatment of a gas with a suitable liquid for removing deleterious components, such as hydrogen sulphide, sulphur dioxide, or carbon dioxide; also the absorption of solvent vapors from waste gases.

Since the apparatus is adapted to treatment of gases for various purposes, one use has been selected and described; specifically, an apparatus for effecting dehydration of a moisture-laden gas stream. It is to be understood, however, that the apparatus is not to be limited to this specific purpose.

Figure 1:
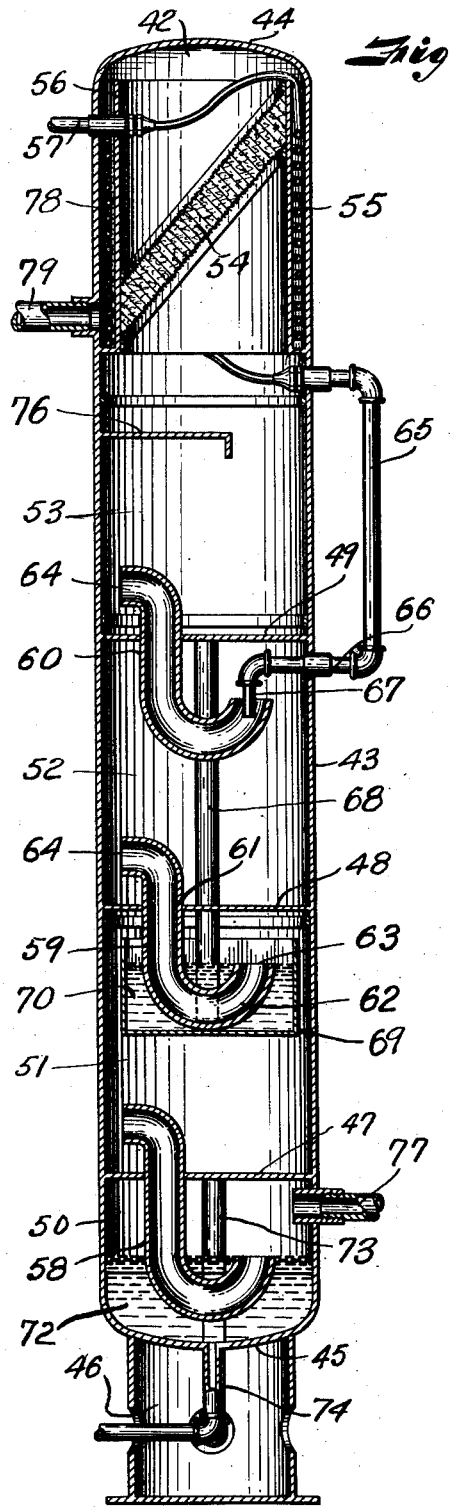
Fig. 1 is a vertical section through an apparatus for contacting a gas mixture with a suitable liquid to effect removal of one or more components of the mixture.

Referring first to the form of the invention illustrated in Figs. 1 to 3 inclusive, 1 designates an elongated cylindrical vessel that is supported in vertical position. The vessel 1 includes a cylindrical wall 2 closed at the ends by upper and lower heads 3 and 4. The lower head is supported on a skirt 5 having a base plate 6 that is adapted for attachment to a suitable foundation, not shown, to support the vessel in vertical position. The treating apparatus is all contained within the vessel and includes a contactor 7 into which the gas stream to be treated is admitted through a pipe 8 that is connected with a coupling 9 secured in the wall 2 of the vessel at a point above the bottom head 4. The contactor includes an L-shaped inlet 10 in connection with the coupling 9, and a depending leg portion 11 that is connected with an upwardly rising leg portion 12 by a reverse bend 13. The leg portion 12 extends upwardly for the major length of the vessel and connects with a depending leg portion 14 through a reverse bend 15. The depending leg portion 14 extends downwardly alongside the leg portion 12 and terminates adjacent the inlet in a laterally extending outlet 16 from which the gas and liquid mixture is discharged into the interior of the vessel. Extending transversely of the vessel, preferably in inclined planes, are upper and lower screens 17 and 18 that retain therebetween a gas contacting bed 19 which may be composed of suitable packing materials having surfaces for collecting any liquid entrained with the upwardly rising gas. If desired, the bed 19 may be wetted with additional liquid admitted through a pipe 28' which discharges onto the upper portion of the bed to provide a second absorbing contact with the ascending gas.

Supported within the vessel substantially on the upper end of the contactor is a sleeve 20, having a diameter less than the diameter of the wall of the vessel to provide an annular passage 22 therebetween that is closed at the bottom by an annular flange 23 so that the gas must flow through the sleeve and over the upper edge 24 into the passage 22. Extending transversely across the interior of the sleeve, preferably at an inclined angle, is a mist extractor 25 which is similar in construction to the bed 19 and which serves to remove any entrained liquid particles remaining with or in the gas.

Connected with the side of the vessel at the lower end of the passageway is an outlet 26 to which a discharge pipe 27 is connected to conduct effluent gas from the contactor.

The absorbing liquid, for example a desiccant solution, such as glycol-water solution is admitted into the depending leg portion 11 of the contactor under the required pressure. This is effected by providing a pipe 28 which may enter the vessel above the mist extractor bed 25 and connect with a heat exchange coil 29 whereby the solution is cooled through heat exchange with the treated gas being discharged from the vessel. The lower end of the heat exchange coil is connected with a pipe 30 that extends downwardly along the inner face of the vessel wall to the bottom thereof where it terminates in a lateral extending portion 31 which is connected with a nozzle 32 that extends upwardly through bend 13 and co-axially within the depending leg 11. The nozzle terminates substantially at the upper end of the leg portion 11 and is provided with spray discharge openings 33 through which the liquid solution is sprayed into the incoming stream of gas to travel in concurrent flow therewith through the legs of the contactor.

It is obvious that, as the gas flows downwardly and upwardly and again downwardly through the contactor, some of the liquid is dispersed within the main body of the gas stream while the remainder of the liquid is spread along the walls of the tubular duct and presents large effective film surfaces in contact with the gas, thereby providing a most effective transfer of the moisture content of the gas into the absorbing solution. It is also obvious that the gas propels and disperses the liquid in an upward direction through the contactor with some of the liquid falling back when the gas flows through and then again rising when contacted by the incoming fresh gas. The liquid is thus maintained in dispersion within the gas flow and moving in both concurrent and countercurrent directions, but in progressive advancement through the contactor until finally being discharged therefrom into the vessel.

During this prolonged movement through the contactor the gas and liquid are intimately contacted to effect optimum absorption of the moisture content of the gas stream.

Likewise, if a liquid hydrocarbon is used for the absorbing liquid as when removing a valuable constituent of the gas, the absorption is most complete and effective.

After the flow enters the vessel the flow velocity is reduced and the liquid begins to drop out and collect with a pool 34 at the bottom of the vessel where the level 35 is maintained substantially constant through operation of an automatic discharge device 36 which may be of any suitable type and which is connected into a discharge pipe 37 which leads from an opening 38 in the wall of the vessel to a reactivator where the absorbed constituent is removed from the solution and the solution is reactivated for recirculation through the contacting vessel. Any liquid remaining in the gas is removed by the mist extractors 19 and 25 and drains back into the vessel. The mist extractors also provide additional liquid contact surfaces for gas treatment.

The vessel may be provided with a baffle 39 over the outlet 38, and the liquid level 35 may be disclosed by providing the vessel with a sight glass 40. All of the liquid may be drained from the vessel through a bottom drain pipe 41 when desired.

Figure 5:
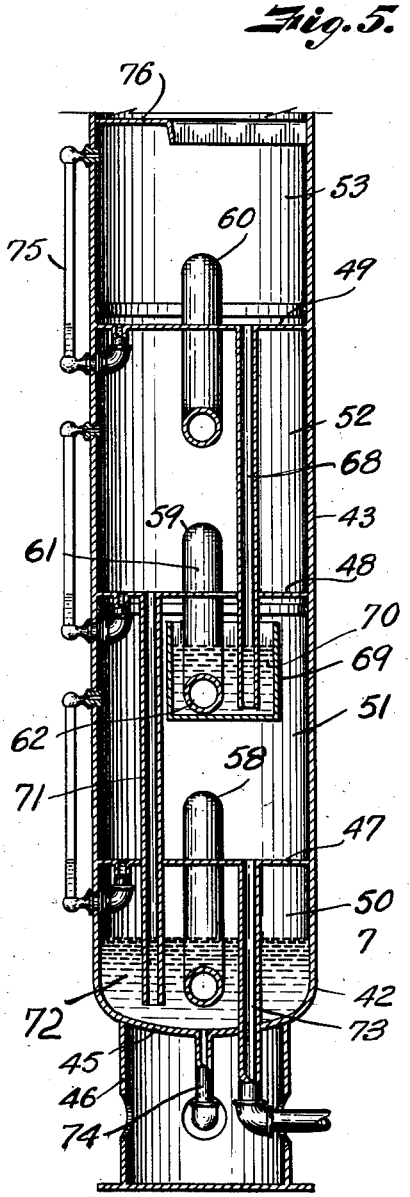
Fig. 5 is a similar section through the lower portion of the apparatus taken at right angles to the section illustrated in Fig. 4.

In Figs. 4 and 5 is illustrated a multistage contacting apparatus which includes an elongated vessel 42 similar to the vessel previously described in that it includes a cylindrical wall 43 closed at the upper and lower ends by heads 44 and 45 and having vertical support on a skirt 46 which is adapted to be attached to a suitable foundation.

Extending transversely within the vessel are partitions 47, 48 and 49 spaced apart to provide contact chambers 50, 51, 52 and 53. The upper end of the vessel is provided with a mist extractor 54 and a heat exchange coil 55 that extends circumferentially of a sleevelike partition 56 in the same manner as in the first described form of apparatus, the coil being connected with a liquid supply pipe 57.

Carried by each of the partitions is a contactor 58, 59 and 60 respectively, each comprising a tubular body 61 extending through a partition and which terminates at its lower end in a reverse bend 62 to present an upwardly opening inlet 63 from the chamber immediately below the respective partitions. The upper end of the tubular body terminates in a laterally extending gas outlet 64 directed against the wall of the vessel for breaking the velocity force of the gas and effecting better separation of the liquid solution in each of the chambers.

The solution is discharged from the heat exchange coil through a pipe 65 that extends exteriorly of the vessel in bypassing relation with the upper partition 49 to re-enter the vessel as indicated at 66. The liquid supply pipe 66 terminates in a depending nozzle 67 that discharges into the upwardly opening inlet 63 of the upper contactor 60 and is carried with the gas through the contactor for discharge into the chamber 53 where the liquid separates and collects on the partition 49 for delivery to the next lower contactor through a pipe 68. The pipe 68 discharges into a pan 69 that is supported within the chamber 51 to carry a body of liquid 70, having a level to permit pick up of the liquid by the gas when moving through the inlet of the contactor 59 for discharge into the chamber 52. From the chamber 52 the liquid drains through a pipe 71 (Fig. 5) leading through the partition 47 into the lower contact chamber 50 in which a body of the liquid collects as indicated at 72 to provide liquid for contact with the gas passing through the lower contactor 58 into the chamber 51. The liquid then drains from the chamber 51 through a pipe 73 leading through the bottom of the vessel. The bottom of the vessel may also be provided with a drain pipe 74 and each of the compartments 50, 51, 52 and 53 may be provided with a gauge glass 75 as shown in Fig. 5. The upper chamber 53 may be provided with a baffle 76 that extends from the wall of the vessel over the outlet of the upper contactor 60. The gas is admitted to the lower compartment 50 through inlet pipe 77 and after flowing through the respective stages is discharged from the passageway 78 which is formed between the sleeve 56 and the wall of the vessel as in the first-described form of the invention, the gas being finally discharged through an outlet pipe 79 that is connected with the lower portion of the passageway.

The operation of the apparatus as shown in Figs. 4 and 5 is as follows:

The treating liquid is admitted through the pipe 57 and, after circulating through the coil 55, is discharged through the pipe 65 and nozzle 67 into the upper contactor 60. The liquid flows from the contactor 60 into chamber 53 and from the chamber 53 through the pipe 68 into the pan 69 to provide the body of liquid 70 for the inlet of the next lower contactor 59. The liquid is discharged from the contactor 59 into the chamber 52 from where it is carried to the bottom of the vessel through the pipe 71 to supply the body of liquid 72 in the chamber 50. The gas, on being admitted through the pipe 77, passes from the chamber 50 through the inlet of the contactor 58 and draws therewith a quantity of the liquid. The liquid is partly dispersed within the gas and other portions collect on the walls of the contactor tube so as to provide the prolonged intimate contact substantially as described in the first form of the invention. The gas on being discharged from the outlet 64 of the contactor 58 discharges within the chamber 51 and releases the liquid that is carried therewith, the liquid being discharged from the vessel through the pipe 73 since it has passed through all of the stages and is ready to be reactivated through removal of the absorbed component of the gas. The gas travels upwardly around the pan 69 and enters the inlet of the contactor 59 to again draw in liquid and effect an intimate mixture within the contactor tube before being discharged through the outlet 64 into the chamber 52. The gas then passes through the inlet of the contactor 60 and is intimately contacted with the liquid first admitted through the nozzle 67. Upon being discharged from the outlet of the contactor 60, the gas enters the chamber 53 and travels under and around the baffle to pass into the lower end of the sleeve 56 and through the mist extractor 54 where any entrained liquid remaining with the gas is removed. The gas then passes over the upper edge of the partition 56 and into the passageway 78 for heat exchange with the incoming liquid in coil 55 and is discharged through the pipe 79. The liquid separated in the chamber 53 is discharged through the pipe 68 into the pan 69 for ultimate discharge from the vessel as previously described, and to the reactivating mechanism (not shown).

From the foregoing it is obvious that I have provided a small, compact apparatus in which a gas flow is effectively and efficiently treated for removing one or more components of the flow. It is also obvious that I have provided for contact of the gas with a liquid in one or more stages in concurrent flow, although the net contacts are in counterflow since the gas is removed from the top of the vessel and the liquid from the bottom.

What I claim and desire to secure by Letters Patent is:

1. An elongated vessel adapted for support on one end, a plurality of vertically spaced partitions dividing the vessel into a plurality of separating chambers, contact ducts extending through the respective partitions to provide riser portions and having reverse bends on their lower ends forming upwardly opening inlets to said riser portions for inflow of gas, means for supplying a liquid medium to said inlets for inflow with the gas to be lifted by the gas through the riser portions for mixture therewith and discharge from the riser portions to an upper separating chamber, a mixed gas inlet connection with the lower chamber and a gas outlet connection with the upper chamber, and means connected with the chambers for removing said liquid medium.

2. An apparatus for contacting a gas mixture with a liquid medium including a vessel having a gas outlet in connection with an upper portion of the vessel and a liquid outlet in the lower portion of the vessel, a plurality of concurrent liquid medium and gas flow contactors within the vessel, means for delivering the gas mixture to the vessel for upward flow through the contactors, means for delivering the liquid medium to the upper contactor for concurrent flow through the next lower contactor in successive order toward the bottom of the vessel, each contactor including a tubular duct having a short leg provided with an upwardly opening inlet into which the liquid medium flows and a vertical riser portion of substantially longer length and terminating in an outlet located a substantial distance above the inlet in which the liquid medium is lifted by the gas mixture, the riser portion and short leg of each tubular duct being connected by a U bend to trap any liquid falling down the riser portion for return concurrent flow with the gas in said vertical riser portion.

3. An elongated vessel adapted for support on one end, a plurality of vertically spaced partitions dividing the vessel into a plurality of separating chambers, contact ducts having vertical riser portions extending through the respective partitions and having reverse bends on their lower ends forming upwardly opening inlets spaced a material distance below the respective partitions to accommodate flow of the gas into said inlets to said riser portions, means for supplying a liquid medium to the inlet of the upper contact duct, means for delivering the liquid for flow to each succeeding contact duct for upward flow with the gas, fluid conveying means in communication with the upper chamber, and means connected with the lower chamber for supplying gas for upward flow through the successive contact ducts.

4. An elongated vessel adapted for support on one end, a plurality of vertically spaced partitions dividing the vessel into a plurality of separating chambers, contact ducts having vertical risers extending through the respective partitions a material distance above and below the partitions and having reverse bends on their lower ends forming upwardly opening inlets to said risers and spaced a material distance below the respective partitions for inflow of gas, means for supplying a liquid medium to the inlet of the contact duct discharging into the upper chamber, means for returning the liquid from the upper chamber to the second lower contact duct for discharge with the gas into the second lower chamber, means for delivering the liquid from the second lower chamber to the lower-most contact duct, means for delivering a mixed gas to the lowest chamber, means for removing the gas from the upper chamber, and means for removal of the liquid after contacting the gas.

5. In a gas contacting apparatus, an elongated vertically positioned vessel having liquid and gas contact means in the lower portion of said vessel, a sleeve-like partition within the upper portion of the vessel and spaced from the wall and top of the vessel to provide a gas flow passageway upwardly through said sleeve-like partition and an annular passageway about said sleeve-like partition, means closing the lower end of the annular passageway, an outlet connection for the gas from the lower end of the annular passageway, a coil contained in the annular passageway for passing the contact liquid in heat exchange relation with the gas, and a mist extractor extending across the sleeve-like partition in the path of the gas for removing any liquid entrained with the gas prior to contact of the gas with the coil.

6. An apparatus for contacting a gas mixture with a liquid medium including a vertically arranged elongated vessel having a gas outlet in connection with an upper portion of the vessel and a liquid outlet and a gas inlet in connection with the lower portion of the vessel separately from the liquid outlet from the vessel, a gas and liquid contacting duct having support within the vessel intermediate the gas inlet and gas outlet and cooperating with walls of the vessel to form a gas and liquid separating space, said duct having a downwardly extending leg portion in position to receive the gas mixture from the inlet, means for conducting contact liquid into the leg portion, said leg portion terminating at its lower end in a reverse bend forming a pocket closed at the bottom for containing a body of the liquid entering the downwardly extending leg, said duct having a leg portion extending upwardly in connection with the reverse bend and forming an upward continuation of the duct for containing the liquid picked up by the gas in said pocket for concurrent and countercurrent flow with the gas as the liquid falls in said upwardly extending leg portion to said pocket, said upwardly extending leg portion having a bend to change the direction of flow and terminating in a lateral opening into said space for discharge of the gas to said gas outlet, and means connected with the liquid outlet of the vessel below said lateral opening to contain and collect a body of liquid discharged with the gas.

7. An apparatus for contacting a gas mixture with a liquid medium including a vessel having a gas outlet in connection with an upper portion of the vessel and a liquid outlet and a gas inlet in connection with the lower portion of the vessel, a gas and liquid contacting duct having support directly within the vessel intermediate the gas inlet and gas outlet and cooperating with walls of the vessel to form a gas and liquid separating space, said duct having a downwardly extending leg portion in position to receive the gas mixture from the inlet, means for conducting contact liquid into the leg portion, said leg portion terminating at its lower end in a reverse bend forming a closed bottom pocket for containing a body of the liquid entering the downwardly extending leg, said duct having a leg portion extending upwardly in connection with the reverse bend and forming an upward continuation of the duct for containing the liquid picked up by the gas in said pocket for concurrent and countercurrent flow with the gas as the liquid falls in said upwardly extending leg portion to said pocket, said upwardly extending leg portion terminating at its upper end in a bend having a lateral opening directly into said space within the vessel for discharge of the gas for upward movement to said gas outlet, means in the vessel below said lateral opening to contain and collect liquid discharged with the gas, a mist extractor in the vessel within the path of the gas flow above said duct for effecting removal of liquid spray and for effecting additional contact of the gas and liquid medium, and a heat exchanger surrounding the mist extractor of the gas flow to said gas outlet, said liquid being supplied to the inlet of the contacting duct by way of said heat exchanger.

8. A gas contacting apparatus including, an elongated vertically positioned vessel having liquid and gas contact means in the lower portion of the vessel, said vessel having a gas inlet and a gas outlet respectively in lower and upper portions of the vessel, a mist extractor extending across the upper portion of the vessel in the path of gas discharged through the gas outlet for removing any liquid entrained with the gas, and a heat exchanger surrounding the mist extractor, said heat exchanger having a liquid inlet and a liquid outlet into the vessel for flow of a contact liquid in indirect heat exchange with the discharge gas for cooling the contact liquid prior to admission to the liquid and gas contact means by the temperature of the discharged gas.

9. A gas contact apparatus including, an elongated vertically positioned vessel having liquid and gas contact means in the lower portion of the vessel, a sleeve-like partition at the upper portion of the vessel to provide a gas flow passageway upwardly within the vessel, a mist extractor extending across the sleeve-like partition in the path of the gas for removing any liquid entrained with the gas, means connecting the partition with the wall of the vessel for confining the flow of gas through the passageway formed by said partition, and means cooperating with the partition to form a pair of flow ducts in surrounding relation with the mist extractor for passage of a contact liquid and the gas which passes through the mist extractor in heat exchange relationship.

References Cited in the file of this patent

UNITED STATES PATENTS

| Number | Name | Date |
|---|---|---|
| 230,992 | Bigelow | Aug. 10, 1880 |
| 545,392 | Tracy | Aug. 27, 1895 |
| 550,776 | Bourgeois | Dec. 3, 1895 |
| 640,796 | Neuhrs | Jan. 9, 1900 |
| 755,705 | Schanche | Mar. 29, 1904 |
| 954,454 | McArthur | Apr. 12, 1910 |
| 1,042,864 | Winks | Oct. 29, 1912 |
| 1,110,868 | Bauer | Sept. 15, 1914 |
| 1,673,732 | Brooks | June 12, 1928 |
| 1,940,198 | Wagner | Dec. 19, 1933 |
| 2,048,179 | Chandler, Jr. | July 21, 1936 |
| 2,361,021 | Gibbs | Oct. 24, 1944 |
| 2,453,447 | McKeown | Nov. 9, 1948 |

FOREIGN PATENTS

| Number | Country | Date |
|---|---|---|
| 860,125 | France | Jan. 7, 1941 |